United States Patent [19]

Das et al.

[11] Patent Number: 5,494,954
[45] Date of Patent: Feb. 27, 1996

[54] NON-AQUEOUS DISPERSION POLYMERIZATION AND STABILIZATION OF POLAR POLYMERIC MICROPARTICLES

[75] Inventors: Suryya K. Das, Fox Chapel Borough; Soner Kilic, Hampton Twp., Allegheny County, both of Pa.

[73] Assignee: PPG Industries, Inc., Pittsburgh, Pa.

[21] Appl. No.: 343,067

[22] Filed: Nov. 21, 1994

Related U.S. Application Data

[63] Continuation-in-part of Ser. No. 223,258, Apr. 4, 1994, abandoned.

[51] Int. Cl.$^6$ ..................................................... C08K 5/70
[52] U.S. Cl. .......................... 524/315; 523/200; 523/201; 523/202; 524/361; 524/364; 524/376; 524/379; 524/389; 524/390; 524/500; 524/502; 524/507; 524/529; 524/531; 524/533
[58] Field of Search ................................. 524/315, 461, 524/361, 364, 376, 379, 389, 390, 500, 502, 507, 529, 531, 533; 523/200, 201, 202

[56] References Cited

U.S. PATENT DOCUMENTS

| | | | |
|---|---|---|---|
| 3,405,087 | 10/1968 | Fryd | 524/461 |
| 3,793,245 | 2/1974 | Clarke et al. | 524/461 X |
| 3,950,284 | 4/1976 | Fukuda et al. | 524/461 |
| 3,956,225 | 5/1976 | Murato et al. | 524/461 X |
| 4,089,828 | 5/1978 | Visishth et al. | 260/29.6 |
| 4,147,688 | 4/1979 | Makhlouf et al. | 260/33.6 |
| 4,190,569 | 2/1990 | Kroker et al. | 260/31.6 |
| 4,220,679 | 9/1980 | Backhouse | 427/401 |
| 4,290,932 | 9/1981 | Wright et al. | 260/29.6 |
| 4,377,661 | 3/1983 | Wright et al. | 524/522 |
| 4,414,278 | 11/1983 | Cohen et al. | 428/402 |
| 4,414,357 | 11/1983 | Wright et al. | 524/513 |
| 4,477,536 | 10/1984 | Wright et al. | 428/522 |
| 4,525,499 | 6/1985 | Hayashi et al. | 524/461 X |
| 4,563,372 | 1/1986 | Kurauchi et al. | 427/409 |
| 4,611,026 | 9/1986 | Olson et al. | 524/548 |
| 4,650,718 | 3/1987 | Simpson et al. | 428/413 |
| 4,845,147 | 7/1989 | Blum et al. | 524/461 |
| 4,849,480 | 7/1989 | Antonelli et al. | 525/303 |
| 5,032,628 | 7/1991 | Choi et al. | 523/409 |
| 5,196,485 | 3/1993 | McMonigal et al. | 525/327.3 |
| 5,212,273 | 5/1993 | Das et al. | 526/323.1 |

FOREIGN PATENT DOCUMENTS

| | | | |
|---|---|---|---|
| 0686208 | 5/1964 | Canada | 524/461 |
| 0721344 | 11/1965 | Canada | 524/461 |
| 0153600 | 1/1963 | European Pat. Off. | |
| 0171235 | 2/1986 | European Pat. Off. | |
| 0245021 | 11/1987 | European Pat. Off. | |
| 0503865A2 | 9/1992 | European Pat. Off. | |
| 0065162 | 8/1985 | Germany | |
| 0967051 | 1/1963 | United Kingdom | |

OTHER PUBLICATIONS

Barrett, K. E. J., "Dispersion Polymerization in Organic Media", Imperial Chemical Industries Limited, Slough, John Wiley & Sons, London, New York, Sydney, Toronto, 1975, pp. 201–241.

*Primary Examiner*—Judy M. Reddick
*Attorney, Agent, or Firm*—Dennis G. Millman

[57] ABSTRACT

An organic colloidal dispersion of polar polymeric microparticles synthesized directly in a non-aqueous polar medium is disclosed. The dispersion is particularly useful for controlling rheological properties such as sag and metallic flake orientation in coating compositions.

18 Claims, No Drawings

NON-AQUEOUS DISPERSION POLYMERIZATION AND STABILIZATION OF POLAR POLYMERIC MICROPARTICLES

CROSS REFERENCE TO RELATED APPLICATIONS

This application is a continuation in part of U.S. patent application Ser. No. 08/223,258 filed on Apr. 4, 1994 and now abandoned, entitled "Non-Aqueous Dispersion Polymerization and Stabilization of Polar Polymeric Microparticles."

This application is related to U.S. patent application Ser. No. 08/223,257 filed on Apr. 4, 1994, entitled "Non-Aqueous Dispersions Of Carboxylic Acid-Functional Polymeric Microparticles Used For Flow Control In Polyepoxide-Polyacid Based Coating Compositions."

BACKGROUND OF THE INVENTION

The present invention relates to synthesis of polar, non-aqueous dispersion polymers and their stabilization. More particularly, the invention relates to polymeric microparticles that find utility in coating applications for enhancing the ability to attain high solids content, to provide rheology control, or to control pigment orientation.

The book entitled DISPERSION POLYMERIZATION IN ORGANIC MEDIA, edited by K. E. J. Barrett, John Wiley and Sons, 1975 describes the synthesis of various non-aqueous dispersion polymers and their stabilization. Although aliphatic hydrocarbons, such as heptane or cyclohexane have been mostly used as the dispersion medium, polar solvents such as fluoro or chloro substituted hydrocarbons, esters, ketones and even alcohols have been used, if required, depending upon the polymer composition and its solubility.

For example, Barrett's text describes non-aqueous dispersion polymerization of acrylonitrile in non-polar solvent such as hexane and polar solvent such as methylethyl ketone. The dispersant used is a "comb" type copolymer of methyl methacrylate containing poly (12-hydroxystearic acid) pendant side chains and randomly distributed pendant polymerizable double bonds. Further, Barrett also describes polymerization of acrylonitrile in ethanol which is a polar solvent using chain transfer reaction to graft initially formed acrylonitrile particles onto dispersant.

Barrett's text also refers to unsuccessful attempts to synthesize poly acrylic or poly methacrylic acid in aliphatic hydrocarbons using various dispersants. He reasons the failure is due to hydrogen bonding of acid monomers in non-polar medium. Later, by the use of polar organic diluents such as esters or ketones, stable dispersions of poly acrylic acid were prepared. In both instances, however, the dispersant contained polymerizable unsaturation, and stabilization was achieved by grafting with the pendant unsaturation.

Prior art however does not describe the synthesis of poly 2-hydroxyethyl acrylate dispersion.

SUMMARY OF THE INVENTION

In accordance with the present invention, there is provided an organic colloidal dispersion of microparticles comprising polymers containing polar groups prepared by non-aqueous dispersion polymerization of:

50 to 100 percent by weight of acrylic acid, methacrylic acid, betacarboxyethyl acrylate, 2-hydroxyethyl acrylate, acrylonitrile, or mixtures thereof;

0 to 15 percent (preferably 0 to 5 percent) by weight of one or more other vinyl monomer; and 0 to 50 percent (preferably 5 to 20 percent) by weight of a crosslinker.

The percentages above are based on total weight of monomers in the polymerization. The crosslinker may be present during the polymerization of the vinyl monomers or it may be introduced at a subsequent step. The polymers are dispersed in a non-aqueous polar medium comprising solvent selected from the group consisting of esters, ketones, and mixtures thereof. The non-aqueous polar medium is adapted to retard hydrogen bonding of the monomers in the vinyl monomer component and to dissolve the polymeric acrylic dispersant. The microparticles are stabilized in a dispersed state by the inclusion of a polymeric acrylic dispersant free of polymerizable unsaturation.

DETAILED DESCRIPTION

The organic colloidal dispersions of the present invention comprise microparticles comprised of polymers that contain polar groups (hereinafter referred to as "polar polymeric microparticles"), the microparticles being stably dispersed in a non-aqueous medium by means of a polymeric acrylic dispersant free of polymerizable unsaturation. By "stable" is meant that the polar polymeric microparticles do not settle or precipitate upon standing. The claimed dispersions of polar polymeric microparticles can be prepared by non-aqueous dispersion polymerization proceeding directly in a non-aqueous polar medium. The polymeric microparticles are insoluble in the non-aqueous medium used for polymerization while the polymeric acrylic dispersant is soluble in the non-aqueous medium. Using this method, microparticle materials with very high levels of functionality, e.g., having a functional monomer content of 50 to 100 percent on a molar basis. As a specific example, with a monomer content consisting entirely of acrylic acid, polymeric microparticles having theoretical acid value of 780 can be produced employing the present invention. Because the polymerization is conducted directly in a non-aqueous medium, it is not necessary to dry the polar polymeric microparticles and transfer them to a different medium, although this is possible.

The term "polar" as used herein to describe solvents or non-aqueous media means substances that contain polar groups such as hydroxyl groups, carboxyl or other acid groups, carbonyl groups, ether groups, ester groups, amide groups, amino groups, halogenated hydrocarbon groups, nitrile groups, or other such polar groups. Conversely, the term "non-polar" describes substances that are essentially free of polar groups such as those mentioned above.

Polar groups contained in the polar polymeric microparticles of the dispersions of the present invention include polar functional groups such as carboxylic acid groups, hydroxyl groups, nitrile groups, or mixtures of these polar functional groups.

The polar polymeric microparticles are prepared from a vinyl monomer component comprising 50 to 100 percent by weight (based on the total weight of monomers in the vinyl monomer component) of: acrylic acid, methacrylic acid, betacarboxyethyl acrylate, 2-hydroxyethyl acrylate, acrylonitrile, or mixtures thereof. The monomers are chosen such that they are soluble in the non-aqueous polar medium in which polymerization is conducted, while the resulting polymer is insoluble.

Preferably, the vinyl monomer component is entirely comprised of the polar functional vinyl monomers listed above or mixtures thereof; however, non-functional vinyl monomers or functional vinyl monomers other than those listed above may be present if the solubility conditions are met. Examples include vinyl ester monomers such as methyl acrylate, methyl methacrylate, n-butyl acrylate, n-butyl methacrylate, and the like: and functional group containing vinyl ester monomers such as 2-hydroxypropyl acrylate, 2-hydroxypropyl methacrylate, 2-hydroxyethyl methacrylate, and the like; or mixtures thereof. If present at all, these monomers may be included in amounts of 0 to 15 percent by weight, preferably 0 to 5 percent, based on the weight of all monomers present.

The polymers of the polar polymeric microparticles of the present invention may be crosslinked or uncrosslinked. Dispersions of polar polymeric microparticles containing crosslinked polymers are generally preferred to dispersions of polar polymeric microparticles formed from uncrosslinked polymers because uncrosslinked materials are more likely to swell or dissolve in the organic solvents that are commonly found in many of the coating compositions to which the dispersions are subsequently added. However, in an alternative embodiment of the present invention, polar polymeric microparticles of the claimed dispersions may be uncrosslinked. In order to provide for crosslinking, a crosslinking agent is included with the vinyl monomers during polymerization, or added to the reaction product of the vinyl monomers after polymerization. The crosslinker is present in amounts of 0 to 50 percent by weight based on the total weight of monomers used in preparing the polymer, preferably from 5 to 20 percent by weight. When a crosslinker is thus incorporated into the polymer, the crosslinker type and level are usually chosen based on the functional groups present in the polar polymeric microparticles. For example, polyepoxide crosslinkers such as 3,4-epoxy cyclohexylmethyl-3,4-epoxy cyclohexane carboxylate, bis(3,4-epoxy cyclohexylmethyl) adipate, 1,3,5-triglycidyl isocyanurate and pentaerythritol tetra(2-glycidyloxycarbonyl cyclohexane carboxylate) are preferred when the polar polymeric microparticles contain carboxylic acid functionality. When the polar polymeric microparticles contain hydroxyl functionality, polyisocyanate or polyanhydride crosslinkers are preferred. The polyisocyanate crosslinkers are particularly preferred.

Examples of suitable polyisocyanate crosslinkers include aromatic diisocyanates such as diphenylmethane-4,4'-diisocyanate or m-phenylene diisocyanate; aliphatic diisocyanates such as hexamethylene diisocyanate or tetramethylxylene diisocyanate; cycloalkylene diisocyanates such as 1,4-cyclohexane diisocyanate or isophorone diisocyanate; tri- or tetra-isocyanates such as triphenylmethane-4,4',4"-triisocyanate or 4,4'-dimethyl diphenylmethane-2,2',5,5'-tetraisocyanate; polymerized polyisocyanates such as tolylene diisocyanate dimers and trimers; and the like. Isophorone diisocyanate is preferred. Examples of suitable polyanhydride crosslinkers include monomeric species such as isoprene disuccinyl anhydride or pyromellitic dianhydride.

Generally, crosslinkers bearing different coreactive functional groups are not mixed. However, it will be appreciated by those skilled in the art that mixtures of such crosslinkers can be prepared and used provided the functional groups are appropriately modified to permit mixture.

The resulting polar polymeric microparticles may have very high functionality, with theoretical acid values up to 780 (e.g., 10 to 780) or theoretical hydroxyl values up to 485. Calculations yielding theoretical acid value and hydroxyl value are well understood by those skilled in the art of polymer synthesis and will not be discussed in detail here. In a particularly preferred embodiment, the polar polymeric microparticles are prepared entirely from acrylic acid such that the resulting polymeric microparticles have a theoretical acid value of about 780 and a theoretical hydroxyl value of zero. On the other hand, preparing the particles entirely from hydroxyethyl acrylate would yield hydroxyl value of about 485 and an acid value of zero.

Typically, polymerization of the vinyl monomers used to prepare the polymeric microparticles is initiated by free radical initiators that are soluble in the non-aqueous polar medium. Examples include peroxy initiators such as benzoyl peroxide, lauroyl peroxide, or tea-butylperoxy-2-ethyl-hexanoate (tert-butylperoctoate); or azo initiators such as 2,2'-azobis (2,4-dimethylpentane nitrile) or 2,2'-azobis (2-methylbutanenitrile). The azo initiators are preferred.

Polymerization of the monomers used to prepare the polymeric microparticles is usually conducted at reflux temperature to prevent oxygen from inhibiting the polymerization reaction. Reflux temperature typically falls in the range of from about 60° C. to about 200° C., and more commonly falls in the range of from about 70° C. to about 140° C., depending on the boiling point of the solvents comprising the non-aqueous medium in which the microparticles are prepared.

The polar polymeric microparticles of the present invention are of colloidal dimensions, that is, from about 0.01 to about 2 microns (100 to 20,000 Angstroms) in diameter, preferably from about 0.05 to about 0.5 microns (500 to 5000 Angstroms) in diameter. The particle size can be measured by light scattering techniques using, for example, a particle size analyzer such as the Coulter $N_4$ instrument, commercially available from Coulter. The dispersions are typically prepared at a solids content of from about 15 percent to about 75 percent by weight, preferably from about 25 percent to about 50 percent by weight, based on the total weight of the dispersion. The solids content is determined at 110° C. for one hour.

A polymeric acrylic dispersant is employed to provide stability to the microparticle dispersion of the present invention. The polymeric acrylic dispersant is free of polymerizable unsaturation. It is theorized that the dispersant is adsorbed onto the surfaces of the polar polymeric microparticles, and stabilizes them in the dispersed state by steric forces. It is further theorized that no grafting or chemical bonding between the dispersant and the polar polymeric microparticles is necessary for stabilization of the dispersion.

The polymeric acrylic dispersant can be prepared from a variety of vinyl monomers including non-functional vinyl monomers; hydroxyl-functional vinyl monomers; glycidyl-functional vinyl monomers; amino-functional vinyl monomers; silane-functional vinyl monomers; N-alkoxyalkyl functional vinyl monomers; or mixtures thereof.

Examples of suitable non-functional vinyl monomers for preparing the polymeric acrylic dispersant include methyl methacrylate; methyl acrylate; n-butyl methacrylate; n-butyl acrylate; styrene; and the like. Examples of suitable hydroxyl-functional vinyl monomers include hydroxyethyl methacrylate; 2-hydroxyethyl acrylate; 2-hydroxypropyl methacrylate; 2-hydroxypropyl acrylate; and the like. Examples of suitable glycidyl-functional vinyl monomers include glycidyl methacrylate; glycidyl acrylate; allyl glycidyl ether; and the like. Examples of suitable aminofunctional vinyl monomers include N,N'-dimethylaminoethyl methacrylate; N-tert-butylaminoethyl methacrylate; and the like. Examples of suitable silane-functional vinyl monomers include vinyl alkoxy, acrylato-alkoxy, and methacrylato-alkoxy silanes such as vinyl trimethoxy silane; gamma-methacryloxypropyl trimethoxy silane; and the like. Examples of suitable N-alkoxyalkyl functional vinyl monomers include N-butoxymethyl acrylamide; N-isobutoxymethyl acrylamide; and the like.

A particularly preferred polymeric acrylic dispersant is prepared from 0 to 80 percent (preferably 30–50 percent) glycidyl methacrylate; 0 to 50 (preferably 10 to 40) percent n-butyl methacrylate; and about 0 to 50 (preferably 10 to 40) percent methyl methacrylate, the percentages based on the weight of monomers used to prepare the dispersant.

Typically, polymerization of the monomers used to prepare the polymeric acrylic dispersant requires free radical initiators. These must be soluble in the non-aqueous polar medium. Examples include peroxy initiators such as benzoyl peroxide, lauroyl peroxide, or tert-butylperoxy-2-ethyl-hexanoate (tert-butylperoctoate); or azo initiators such as 2,2'-azobis (2,4-dimethylpentane nitrile) or 2,2'-azobis (2-methylbutane nitrile). The azo initiators are particularly preferred.

The polymeric acrylic dispersant is typically prepared by solution polymerization techniques. As described above in connection with the polymeric microparticles, polymerization of the monomers used to prepare the polymeric acrylic dispersant is usually conducted at reflux temperature to prevent oxygen from inhibiting the polymerization reaction. Reflux temperature typically falls in the ranges described above for the polymeric microparticle.

The polymeric acrylic dispersant typically has a number-average molecular weight of from about 500 to about 100,000, preferably from about 1,000 to about 30,000 and more preferably from about 1,000 to about 10,000, as determined by gel permeation chromatography using polystyrene as a standard. The dispersant is typically prepared at a solids content of from about 20 percent to about 80 percent, preferably from about 50 percent to about 60 percent by weight, based on the total weight of the polymeric acrylic dispersant, as determined at 110° C. for one hour. The polymeric acrylic dispersant is typically present in the dispersion of polar polymeric microparticles at levels of from 2 percent to 90 percent, preferably from 10 percent to 50 percent and more preferably from 20 percent to 30 percent, the percentage based on the weight of the solids of the dispersion.

The non-aqueous medium in which the dispersion polymerization proceeds is one that is adapted to retard hydrogen bonding of the monomers in the vinyl monomer component described above. Further, the medium is chosen such that the vinyl monomers used to make the polar polymeric microparticles are dissolved but the resulting particulate polymer is not dissolved. Additionally, the non-aqueous medium is chosen such that it dissolves the polymeric acrylic dispersant. The non-aqueous medium is comprised of ester or ketone solvents or mixtures thereof; preferably, it is comprised of ethyl acetate or a mixture of ethyl acetate and another suitable ester solvent. Other suitable ester solvents include n-butyl acetate, n-hexyl acetate, and mixtures thereof. Examples of suitable ketone solvents include methyl ethyl ketone; methyl isobutyl ketone; and mixtures thereof. Mixtures of ester and ketone solvents can also be used. For example, a mixture of ethyl acetate and methyl ethyl ketone can be used as the non-aqueous medium.

Typically, crosslinking is conducted in a separate synthetic step after the polar polymeric microparticles have been prepared. However, one can add the crosslinker with the vinyl monomer component provided the solubility conditions are met. More specifically, the crosslinker is chosen such that it is soluble in the non-aqueous medium in which polymerization is conducted. Further, the crosslinker is chosen such that the polymerization reaction produces a crosslinked polar polymeric microparticle that is insoluble in the non-aqueous medium in which the polymerization is conducted. In order to include the crosslinker in the vinyl monomer polymerization crosslinkers are chosen that comprise polyfunctional vinyl monomers, for example, ethylene glycol dimethacrylate, divinyl benzene, pentaerythritol triacrylate, and the like. However, excessive amounts of these types of crosslinkers can lead to flocculation; therefore, polyisocyanates or epoxides are preferred crosslinkers for this purpose. This in situ crosslinking generally employs lower amounts of crosslinker compared to a separate crosslinking step in order to avoid instability.

Polar polymeric microparticles prepared in accordance with the present invention can be transferred to a non-aqueous medium different from that in which the microparticles are prepared. This is more readily accomplished when the microparticles have been crosslinked since flocculation and swelling are less likely to occur. Although transfer of uncrosslinked particles is not preferred, the medium into which the dispersion of uncrosslinked microparticles is transferred should be chosen such that it will not destabilize the dispersion by causing flocculation, nor swell the polar polymeric microparticles. In other words, the medium into which the dispersion of uncrosslinked particles is transferred must be a "poor" solvent for the microparticles but a "good" solvent for the polymeric acrylic dispersant; that is, it is chosen such that it will not dissolve the polar polymeric microparticles but will dissolve the polymeric acrylic dispersant.

Examples of solvents to which the crosslinked microparticle dispersions can be transferred include alcohols such as ethanol, n-propanol, isopropanol, n-butanol, and the like; esters such as n-butyl acetate, n-hexyl acetate, pentyl propionate, and the like; ethers such as the monoethyl, monobutyl and monohexyl ethers of ethylene glycol, and the like; ketones such as methyl ethyl ketone methyl isobutyl ketone, diisobutyl ketone, and the like; aromatic hydrocarbons such as xylene, or toluene, and the like; and mixtures thereof. Although a variety of solvents are offered as examples, solvents that are relatively much more or much less polar than the polar polymeric microparticles are not preferred. With these materials, transfer becomes difficult because of potential problems with destabilization of the dispersion and swelling of the microparticles. Particularly preferred solvents into which crosslinked polar polymeric microparticles can be transferred are n-propanol, n-butyl acetate and ethyl 3-ethoxy propionate.

Generally, it is difficult to transfer uncrosslinked polar polymeric microparticles to the solvents given as examples above because of their tendency to swell.

Transfer to a different medium can be achieved by a variety of methods, for example, by spray-drying, freeze-drying, coagulation, or centrifugation followed by redispersion in the new medium. Preferably, transfer to a different medium is accomplished by adding a new organic solvent to the dispersion then removing the unwanted solvent by distillation. All of these methods are well understood by those skilled in the art and will not be discussed in detail here.

The dispersions of polar polymeric microparticles can contain various other optional ingredients such as cosolvents or catalysts, although preferably these are absent.

The dispersions of polar polymeric microparticles prepared as described above are easily incorporated into coating compositions with agitation. The amount of microparticle solids that is present in the coating composition is generally from one percent to 80 percent by weight, preferably from five percent to 70 percent by weight, based on the total weight of solids present in the coating composition. The use of these dispersions is particularly desirable in coating compositions containing flake pigments, particularly aluminum flake or mica, in that they help to orient the pigment properly in the film, resulting in a lustrous shiny appearance with excellent "flop," distinctness of image and high gloss. "Flop" describes the visual change in brightness or lightness of a metallic coating with a change in viewing angle, that is, a change from 180 to 90 degrees. Also, the claimed dispersions of polar polymeric microparticles are particularly effective in preventing sagging of pigmented or non-pigmented coating compositions.

Dispersions of polar polymeric microparticles in which the microparticles contain high levels of carboxylic acid functionality are particularly useful when they are incorporated into acid-cured epoxy coating compositions. These can be either one-package or two package systems. Dispersions of polar polymeric microparticles in which the microparticles contain high levels of hydroxyl functionality, i.e., theoretical hydroxyl value up to about 485 are particularly useful when they are incorporated into melamine-, urethane-, or isocyanate-cured acrylic, polyester or epoxy coating compositions. These can also be either one-package or two-package systems.

Illustrating the invention are the following examples that, however, are not to be considered as limiting the invention to their details. All percentages in the examples as well as throughout the specification are by weight unless otherwise indicated.

EXAMPLES

Polymeric Acrylic Dispersants

The following Examples 1 through 9 show the synthesis of various polymeric acrylic dispersants used in the preparation of the claimed dispersions of polar polymeric microparticles.

In all these examples, particle size is reported in Angstroms and was determined using a Coulter $N_4$ particle size analyzer, commercially available from Coulter. Number average molecular weight was determined by gel permeation chromatography using polystyrene as a standard. Weight percent solids were determined at 110° C. for one hour.

EXAMPLE 1

The following example shows the preparation of a glycidyl-functional polymeric acrylic dispersant in ethyl acetate by solution polymerization techniques.

| INGREDIENT | GRAMS |
|---|---|
| Initial Charge | |
| Ethyl Acetate | 750.0 |
| Feed | |
| Ethyl Acetate | 750.0 |
| Glycidyl Methacrylate | 800.0 |
| n-Butyl Methacrylate | 600.0 |
| Methyl Methacrylate | 600.0 |
| VAZO ® -67[1] | 100.0 |

[1]2,2'-azobis(2-methylbutanenitrile), commercially available from E. I. du Pont de Nemours & Company.

The initial charge was heated to reflux temperature with agitation in a reaction vessel suitable for acrylic solution polymerization. The feed was added in a substantially continuous manner over a period of five hours while maintaining the reaction mixture at reflux temperature. At the completion of the feed, the reaction mixture was held for three hours at reflux temperature to complete the polymerization. The resultant acrylic polymer was cooled and filtered to yield a resin at 61.4 weight percent solids with a number-average molecular weight of 6,968.

EXAMPLES 2–9

The following examples show the preparation of functional and non-functional polymeric acrylic dispersants in various solvents by the same solution polymerization technique that was described in Example 1, above.

The figures in the following table represent the weight percent of each component, excluding initiator, used to prepare the polymeric acrylic dispersants, based on the total weight of all monomers present. The amount of initiator is presented as weight percent based on the total weight of monomers present.

| | EXAMPLE | | | | | | | |
|---|---|---|---|---|---|---|---|---|
| INGREDIENT | 2 | 3 | 4 | 5 | 6 | 7 | 8 | 9 |
| MMA[1] | 45.0 | 50.0 | 20.0 | 50.0 | 50.0 | 40.0 | 42.5 | 45.0 |
| BA[2] | 45.0 | 50.0 | 20.0 | 50.0 | 50.0 | | | 45.0 |
| BMA[3] | | | | | | 40.0 | 42.5 | |
| GMA[4] | | | 60.0 | | | | | |
| HPMA[5] | 10.0 | | | | | | | 10.0 |
| AA[6] | | | | | | | 15.0 | |
| DMAEMA[7] | | | | | | 20.0 | | |
| Initiator | | | | | | | | |
| VAZO-67 | 5.0 | 5.0 | 5.0 | 5.0 | 5.0 | 5.0 | 5.0 | |
| LUPERSOL ® PMS[8] | | | | | | | | 1.5 |
| Solvent[9] | EtAc | BuAc | EtAc | MEK | MIBK | EtAc | EtAc | EtAc |

-continued

| | EXAMPLE | | | | | | | |
|---|---|---|---|---|---|---|---|---|
| INGREDIENT | 2 | 3 | 4 | 5 | 6 | 7 | 8 | 9 |
| Weight % Solids | 58.5 | 55.8 | 59.2 | 58.4 | 56.1 | 59.7 | 60.9 | 55.1 |
| Mn[10] | 8,988 | 3,452 | 7,182 | 6,091 | 3,880 | 6,679 | 7,906 | N/A[11] |

[1]Methyl methacrylate
[2]n-Butyl acrylate
[3]n-Butyl methacrylate
[4]Glycidyl methacrylate
[5]2-Hydroxypropyl methacrylate
[6]Acrylic acid
[7]N,N-Dimethylaminoethyl methacrylate
[8]tert-Butylperoxy-2-ethylhexanoate (tert-butylperoctoate), at 50% active material in odorless mineral spirits, commercially available from Atochem.
[9]EtAc is ethyl acetate; BuAc is n-butyl acetate; MEK is methylethyl ketone; and MIBK is methyl isobutyl ketone.
[10]Number-average molecular weight.
[11]The number-average molecular weight of this material was not determined.

EXAMPLE 10

(COMPARATIVE)

The following example shows the preparation of a non-functional polymeric acrylic dispersant similar to that of Example 3, but in which the solvent was replaced with toluene. This is a comparative example showing the preparation of a polymeric acrylic dispersant in a medium that is unsuitable for the non-aqueous dispersion polymerization that is subsequently conducted.

The following initial charge and feed were used in the preparation.

| INGREDIENT | GRAMS |
|---|---|
| Initial Charge | |
| Toluene | 375.0 |
| Feed | |
| Toluene | 350.0 |
| n-Butyl Acrylate | 500.0 |
| Methyl Methacrylate | 500.0 |
| VAZO-67 | 50.0 |

The resultant acrylic polymer was cooled and filtered to yield a resin at 57.2 weight percent solids with a number-average molecular weight of 4,004.

Dispersions of Uncrosslinked Polar Polymeric Microparticles

The following Examples I through XI show the preparation of dispersions of uncrosslinked polar polymeric microparticles using the various functional and non-functional polymeric acrylic dispersants prepared above in Examples 1–10.

EXAMPLE I

The following example shows the preparation of carboxylic acid-functional polar polymeric microparticles dispersed in ethyl acetate in the presence of the glycidyl-functional polymeric acrylic dispersant of Example 1, above.

| INGREDIENT | GRAMS |
|---|---|
| Initial Charge | |
| Polymeric Acrylic Dispersant of Example 1 | 246.7 |

| INGREDIENT | GRAMS |
|---|---|
| Ethyl Acetate | 1559.4 |
| Feed | |
| Ethyl Acetate | 151.4 |
| Acrylic Acid | 454.5 |
| LUPERSOL PMS | 18.2 |

The initial charge was heated to reflux temperature with agitation in a reaction vessel suitable for dispersion polymerization. Five weight percent of the feed was added to the reaction mixture at a fast rate, and the reaction mixture was held at reflux temperature for an additional 30 minutes for seed particle formation. The remainder of the feed was added in a substantially continuous manner over a period of three hours while maintaining the reaction mixture at reflux temperature. At the completion of the feed, the reaction mixture was held for about two hours at reflux temperature to complete the polymerization. The reaction product was cooled and filtered to yield a stable dispersion at 26.9 weight percent solids with a particle size of 3630 Å.

EXAMPLES II–XI

The following examples show the preparation of dispersions of uncrosslinked polar polymeric microparticles using the method of Example I. The figures in the following table represent the weight percent of each component, excluding initiator, used to prepare the dispersions. The amount of initiator is presented as weight percent based on the total weight of monomers present.

| | EXAMPLE | | | | | | | | | |
|---|---|---|---|---|---|---|---|---|---|---|
| | II | III | IV | V | VI | VII | VIII | IX | X | XI |
| INGREDIENT | | | | | | | | | | |
| DISPERSANT | | | | | | | | | | |
| Polymeric Acrylic Dispersant of Ex. 2 | 25.0 | | | | | | | | 25.0 | |
| Polymeric Acrylic Dispersant of Ex. 3 | | 25.0 | | | | | | | | |
| Polymeric Acrylic Dispersant of Ex. 4 | | | 25.0 | 62.5 | | | | | | |
| Polymeric Acrylic Dispersant of Ex. 5 | | | | | 25.0 | | | | | |
| Polymeric Acrylic Dispersant of Ex. 6 | | | | | | 25.0 | | | | |
| Polymeric Acrylic Dispersant of Ex. 8 | | | | | | | 25.0 | | | |
| Polymeric Acrylic Dispersant of Ex. 9 | | | | | | | | 46.9 | | |
| Polymeric Acrylic Dispersant Prepared According to the Method of Ex. 8[1] | | | | | | | | | | 25.0 |
| MICROPARTICLES | | | | | | | | | | |
| AA | | 75.0 | | | 3.8 | 3.8 | 37.5 | | | 35.6 |
| HEA[2] | 75.0 | | | | 71.2 | 71.2 | 37.5 | | 75.0 | 35.6 |
| MAA[3] | | | | | | | | 53.1 | | |
| Beta-CEA[4] | | | 45.0 | 37.5 | | | | | | |
| ACN[5] | | | 30.0 | | | | | | | |
| BA[6] | | | | | | | | | | 3.8 |
| INITIATOR | | | | | | | | | | |
| VAZO-67 | | | 2.0 | 2.0 | | | | | | 1.0 |
| LUPERSOL PMS | 2.0 | 2.0 | | | 2.0 | 2.0 | 2.0 | | 2.0 | |
| VAZO-52[7] | | | | | | | | 2.0 | | |
| Solvent | EtAc | BuAc | EtAc | EtAc | MEK | MIBK | EtAc | EtAc | EtAc | EtAc |
| Weight % Solids | 24.1 | 51.4 | 50.3 | 52.5 | 52.9 | 51.4 | 25.3 | 30.1 | 49.4 | 25.2 |
| Particle Size (Å) | 3310 | 1390 | | 4900 | | | 2970 | | 4140 | |

[1] A polymeric acrylic dispersant was prepared as described in Example 8, but the dispersant was diluted to 45.4 weight % solids with ethyl acetate after polymerization was completed.
[2] 2-Hydroxyethyl acrylate
[3] Methacrylic acid
[4] Beta-Carboxyethylacrylate
[5] Acrylonitrile
[6] n-Butyl Acrylate
[7] 2,2'-Azobis(2,4-dimethylvaleronitrile), commercially available from E. I. duPont de Nemours & Company.

EXAMPLE XII

(COMPARATIVE)

The following example shows the preparation of acid- and hydroxyl-functional polar polymeric microparticles dispersed in toluene in the presence of the non-functional dispersant of Example 10, above. This is a comparative example showing the preparation of a dispersion in an unsuitable medium.

| INGREDIENT | GRAMS |
|---|---|
| *Initial Charge* | |
| Polymeric Acrylic Dispersant of Example 10 | 206.6 |
| Toluene | 361.2 |
| *Feed A* | |
| Acrylic Acid | 18.1 |
| LUPERSOL PMS | 0.7 |
| *Feed B* | |
| 2-Hydroxyethyl Acrylate | 343.5 |
| LUPERSOL PMS | 13.7 |
| Toluene | 34.8 |

The initial charge was heated to reflux temperature with agitation in a reaction vessel suitable for dispersion polymerization. Feed A was added to the reaction mixture at a fast rate and the reaction mixture was held at reflux temperature for 30 minutes for seed particle formation. Feed B was added in a substantially continuous manner over a period of three hours while maintaining the reaction mixture at reflux temperature. At the completion of Feed B, the reaction mixture was held for about two hours at reflux temperature to complete the polymerization. The reaction product settled out immediately after agitation ceased and did not yield a stable dispersion.

Preparation of Dispersions of Crosslinked Polar Polymeric Microparticles

The following Examples XIII through XV show the preparation of dispersions of crosslinked polar polymeric microparticles.

EXAMPLE XIII

The following example shows the preparation of a dispersion of carboxylic acid-functional polar polymeric microparticles that were crosslinked with a polyepoxide crosslinker.

| INGREDIENT | GRAMS |
| --- | --- |
| Initial Charge | |
| Dispersion of Example III | 300.0 |
| ARALDITE ® PT 810[1] | 15.24 |

[1] 1,3,5-Triglycidyl isocyanurate, commercially available from Ciba-Geigy Corporation The initial charge was heated to reflux temperature with agitation in a reaction vessel suitable for dispersion polymerization and held at that temperature until the epoxy equivalent weight was greater than 100,000. About 3½ hours were required to reach that epoxy equivalent weight. The reaction product was cooled to yield a stable dispersion at 55.4 weight percent solids. The particle size of this material was not determined.

EXAMPLE XIV

The following example shows the preparation of a dispersion of hydroxyl-functional polar polymeric microparticles that were crosslinked with an isocyanate crosslinker.

| INGREDIENT | GRAMS |
| --- | --- |
| Initial Charge | |
| Dispersion of Example X | 300.0 |
| Dibutyltin Dilaurate | 1.6 |
| Feed A | |
| Isophorone Diisocyanate | 5.3 |
| Feed B | |
| n-Butyl Acetate | 225.0 |

The initial charge was heated to reflux temperature in a vessel suitable for hydroxyl-isocyanate reaction. Feed A was added over 15 minutes at reflux temperature and the reaction mixture was held at reflux until the isocyanate groups were consumed, as detected by infrared spectrophotometry. About 1½ hours were required to react the isocyanate groups with the hydroxyl groups. Feed B was subsequently added to the reaction mixture, and then 225.0 grams of the solvent mixture was removed by distillation. The final temperature was 117° C. The reaction product was cooled to yield a stable dispersion at 51 weight percent solids with a particle size of 4,430 Å.

EXAMPLE XV

The following example shows the preparation of a dispersion of crosslinked carboxylic acid- and hydroxyl-functional polar polymeric microparticles in which the crosslinker comprises a polyfunctional vinyl comonomer. The example further shows how crosslinking can be conducted without the need for a separate synthetic step after the polar polymeric microparticles have been prepared. In this example, the crosslinker was added with the vinyl monomer component.

| INGREDIENT | GRAMS |
| --- | --- |
| Initial Charge | |
| Polymeric Acrylic Dispersant Prepared According to the Method of Example 8[1] | 121.2 |
| Ethyl Acetate | 469.6 |
| Feed | |
| Ethyl Acetate | 122.5 |
| Acrylic Acid | 78.4 |
| 2-Hydroxyethyl Acrylate | 78.4 |
| Ethylene Glycol Dimethacrylate | 8.3 |
| VAZO-67 | 1.7 |

[1] A polymeric acrylic dispersant was prepared as described in Example 8, but the dispersant was diluted to 45.4 weight % solids with ethyl acetate after polymerization was completed.

The initial charge was heated to reflux temperature with agitation in a vessel suitable for dispersion polymerization. Five weight percent of the feed was added to the reaction mixture at a fast rate, and the reaction mixture was held at reflux temperature for 30 minutes for seed particle formation. Then the remainder of the feed was added in a substantially continuous manner over a period of three hours while maintaining the reaction mixture at reflux temperature. At the completion of the Feed, the reaction mixture was held for about two hours at reflux temperature to complete the polymerization. The reaction product was cooled and filtered to yield a stable dispersion at 26.2 weight percent solids with a particle size of 3220 Å.

We claim:

1. A non-aqueous colloidal dispersion comprising:
   (a) polar polymeric microparticles which are the product of dispersion polymerization of acrylic monomers in a non-aqueous polar polymerization medium selected from the group consisting of esters, ketones, and mixtures thereof, in the presence of a polymeric acrylic dispersant which is free of polymerizable unsaturation and which is soluble in said polymerization medium, said acrylic monomers comprising on a weight basis of total monomers and crosslinkers:
      (i) 50 to 100 percent of vinyl monomers selected from the group consisting of acrylic acid, methacrylic acid, beta-carboxyethyl acrylate, 2-hydroxyethyl acrylate, acrylonitrile, and mixtures thereof;
      (ii) 0 to 15 percent vinyl monomers other than those in (i); and
      (iii) 0 to 50 percent crosslinkers; whereby the product of the polymerization is insoluble in the polymerization medium; and
   (b) non-aqueous dispersion solvent which may be the same as or different from the polymerization medium.

2. The dispersion of claim 1 wherein the polymeric microparticles comprise no more than 5 percent of the monomers of (ii).

3. The dispersion of claim 1 wherein the polar polymeric microparticles have a particle size of from 0.01 microns to 2 microns.

4. The dispersion of claim 1 wherein the polar polymeric microparticles have a particle size of from 0.05 microns to 0.50 microns.

5. The dispersion of claim 1 wherein the polar polymeric microparticles have a theoretical acid value of up to 780 and a theoretical hydroxyl value of up to 485.

6. The dispersion of claim 1 wherein the polar polymeric microparticles have a theoretical acid value from 10 to 780.

7. The dispersion of claim 1 wherein the polymeric acrylic dispersant has a number-average molecular weight of from 500 to 100,000.

8. The dispersion of claim 7 wherein the polymeric acrylic dispersant has a number-average molecular weight of from 1,000 to 10,000.

9. The dispersion of claim 1 wherein the polymeric acrylic dispersant is present at a level of from 2 percent to 90 percent, the percentage based on the weight of the solids of the dispersion.

10. The dispersion of claim 9 wherein the polymeric acrylic dispersant is present at a level of from 10 percent to 50 percent, the percentage based on the weight of the solids of the dispersion.

11. The dispersion of claim 1 wherein the non-aqueous polar polymerization medium comprises an ester solvent which is ethyl acetate.

12. The dispersion of claim 1 wherein the crosslinker content of (iii) is 5 to 20 percent.

13. The dispersion of claim 1 wherein the polar polymeric microparticles contain carboxylic acid functionality, and are crosslinked with a polyepoxide crosslinker.

14. The dispersion of claim 1 wherein the polar polymeric microparticles contain hydroxyl functionality, and are crosslinked with an isocyanate crosslinker.

15. The dispersion of claim 1 wherein the non-aqueous dispersion solvent (b) is selected from the group consisting of alcohols, esters, ethers, ketones, aromatic hydrocarbons, and mixtures thereof.

16. The dispersion of claim 1 wherein the vinyl monomer component (i) is selected to be acrylic acid solely.

17. The dispersion of claim 16 wherein the polymeric acrylic dispersant is prepared from glycidyl methacrylate, n-butyl methacrylate, and methyl methacrylate.

18. The dispersion of claim 16 wherein the amount of vinyl monomer component (ii) is 0.

* * * * *